United States Patent [19]
Schulz

[11] 3,962,483
[45] June 8, 1976

[54] PREPARATION OF MELT-RESISTANT PROCESS CHEESE

[75] Inventor: Max Erich Schulz, Ascheberg, Germany

[73] Assignee: Gervais-Danone AG, Munich, Germany

[22] Filed: Mar. 27, 1974

[21] Appl. No.: 455,284

Related U.S. Application Data

[63] Continuation-in-part of Ser. No. 259,864, June 5, 1972, abandoned.

[30] Foreign Application Priority Data

June 3, 1971 Germany............................ 2127531

[52] U.S. Cl.................................. 426/582; 426/401; 426/409; 426/522; 426/656
[51] Int. Cl.².................. A23C 19/00; A23C 19/12; A23C 19/14
[58] Field of Search ............ 426/186, 188, 187, 360, 426/361, 227, 36, 582, 654, 656, 522, 401, 409

[56] References Cited
UNITED STATES PATENTS

| | | | |
|---|---|---|---|
| 1,514,780 | 11/1924 | Morton | 426/186 |
| 2,682,469 | 6/1954 | Stuart et al. | 426/187 |
| 3,806,606 | 4/1974 | Seiden | 426/188 |

FOREIGN PATENTS OR APPLICATIONS

646,670   1937   Germany

OTHER PUBLICATIONS

Kosikomski; F., Cheese and Fermented Milk Foods, Published by the Author, Cornell University, New York, 1966 (pp. 290–303).

*Primary Examiner*—David M. Naff
*Attorney, Agent, or Firm*—Michael J. Striker

[57] ABSTRACT

A method for making a process cheese resistant to melting is disclosed. This is accomplished by adding to the process cheese between 1 and 20% by weight of a protein which coagulates at temperatures in excess of about 70°C. The protein is added to the process cheese after production of the latter has been completed and when the process cheese has a temperature lower than 70°C. Upon subsequent heating of the process cheese to temperatures in excess of about 70°C, the protein coagulates thereby stiffening the process cheese and preventing melting of the same.

6 Claims, No Drawings

PREPARATION OF MELT-RESISTANT PROCESS CHEESE

CROSS-REFERENCE TO RELATED APPLICATIONS

This application is a continuation-in-part of my copending application Ser. No. 259,864, filed June 5, 1972 and entitled "A Method for Preventing Melting of Process Cheese on Subsequent Heating," now abandoned.

BACKGROUND OF THE INVENTION

The invention relates generally to cheeses and, more particularly, to process cheeses and a method of making the same.

The term "process cheese" as used herein will be understood to include those disclosed in the Federal Register, 24, 6478 (1959) and identified by the following Standard Numbers: 19.750, 19.755, 19.760, 19.765, 19.770, 19.775, 19.776 and 19.780.

The known methods by which process cheeses are made are described, for example, in the above-referenced Standards. However, it is briefly noted here that the basic principle for the production of process cheese or preparations obtained therefrom resides in comminuting unprocessed cheese or raw casein and then adding thereto other desired ingredients such as water, milk components or products and aromatizing foods. Emulsifying salts such as phosphates and citrates are also added in order to hydrate the unprocessed cheese or raw casein, and these are added in such a quantity, for example, about 3% by weight, that the resulting process cheese melts upon being heated to temperatures of about 60°C. Finally, the process cheese in liquid form is heated in the temperature range of about 80° to 110°C for an extended period of time in order to improve the preservative properties thereof. While still hot, the process cheese is packed in suitable containers such as foil packages and the thus-packaged process cheese subsequently is used mainly on bread.

A particular use for process cheese resides in the making of hot cheese dishes such as bread or toast with crisped process cheese (Welsh Rarebits), scrambled eggs with process cheese, pancakes with process cheese, cheese souffles, meat and fish dishes with inlays of process cheese, etc. Since process cheese melts at temperatures between approximately 55° and 70°C, melting of the process cheese occurs when making these so-called hot cheese dishes. However, melting of the process cheese is a disadvantage for these hot cheese dishes.

Melting of the process cheese when making hot cheese dishes is in contrast to what occurs when using hard cheeses or so-called natural cheeses. Thus, although, generally speaking, cheeses soften at a temperature of about 50°C, and although certain hard cheeses such as, for instance, cheddar and swiss cheese, will melt at temperatures of about 80° to 90°C thereby yielding a cheese food known as fondue, it is nevertheless true that when slices of cheddar, gouda or swiss cheese, for example, are heated on toast, they will flow to only a slight extent. The cheese slices will lie closely adjacent the underlying support which may be, for instance, toast with ham or a slice of bread. On the other hand, if such toasting is carried out using the same quantities of heat but with process cheese instead of the aforementioned hard cheeses, the process cheese will melt in dependence upon its water content and run off the bread.

Despite the fact that hard cheeses and natural cheeses flow to only a slight extent when heated, these cheeses still exhibit certain disadvantages. Thus, hard cheeses, ripened cheese, cottage cheese, fresh cheese and the like tend to form threads, become tough and release whey when subjected to heat treatment such as, for example, crisping or frying.

On the one hand, then, it would be desirable for process cheeses which are to be used for toasting, grilling, broiling, frying, baking and the like to remain firm and not to flow too extensively when subjected to such heat treatments as is the case for the hard cheeses and natural cheeses mentioned above. On the other hand, it would be desirable if, at the same time, the disadvantages associated with these hard and natural cheeses could be eliminated. Although attempts have been made in the direction of making process cheeses melt-resistant by reducing the water content or by using increased quantities of emulsifying salts, these attempts have been largely unsuccessful.

SUMMARY OF THE INVENTION

It is, accordingly, a general object of the invention to provide a novel process cheese and a method of making the same.

More particularly, it is an object of the invention to provide a melt-resistant process cheese and a method of making the same.

Another object of the invention is to provide a process cheese which will not melt upon being subjected to heat treatment subsequent to its production, and a method of making such a process cheese.

A more specific object of the invention is to provide a process cheese which will not, subsequent to its production, flow under the influence of heat as when making hot cheese dishes such as toast with cheese and the like, and a method for making such a process cheese.

Yet another object of the invention is to provide a process cheese which does not form threads, become tough and release whey when subjected to a heat treatment, and a method of making such a process cheese.

It is also an object of the invention to provide a process cheese whereby hot cheese dishes superior to those known heretofore may be produced, and a method of making such a process cheese.

In pursuance of the above objects, and of others which will become apparent, the invention provides, in a method of making a melt-resistant process cheese, for adding to a process cheese a heat-coagulating substance in a quantity sufficient to stiffen the process cheese when the latter is heated to at least the coagulation temperature of the substance. The heat-coagulating substance is added to the process cheese subsequent to production of the process cheese. Advantageously, the heat-coagulating substance is added to the process cheese when the latter has a temperature lower than the coagulation temperature of the substance.

Thus, when the process cheese is heated to the coagulation temperature of the heat-coagulating substance after the latter has been added to the process cheese, this substance coagulates. As a result of this coagulation, a stiffening structure is formed in the process cheese during the heat treatment so that the process cheese is stiffened or becomes rigid and, therefore, does not flow.

DESCRIPTION OF THE PREFERRED EMBODIMENTS

Although any suitable heat-coagulating substance may be used in accordance with the invention, the heat-coagulating proteins such as the albumins and globulins have been found to be particularly advantageous. These proteins coagulate at a temperature of about 70°C. Thus, according to the invention, the protein or proteins are added to the process cheese after the production thereof has been completed and, preferably, this addition is carried out when the process cheese has a temperature lower than approximately 70°C, that is, lower than the coagulation temperature of the proteins.

In order to fully understand the underlying concepts of the invention, it must be pointed out that it is known to add heat-coagulating proteins to process cheese. The proteins may be added to the process cheese in the form of foods containing proteins such as, for example, ham, heat-coagulated whey and albumin-containing milk powder. However, in the known methods of making processed cheese, the proteins are added during the production of the process cheese. These proteins coagulate during the heating undergone by the process cheese while it is being made and become finely dispersed in the process cheese by virtue of the stirring to which the process cheese is subjected during its production. Moreover, the heat-coagulating proteins are added in such small amounts that the process cheese itself does not coagulate when heated to the conventional melting temperatures or to temperatures between about 75° and 90°C. In this connection, it may be seen that, if the proteins were added in such large amounts as to cause coagulation of the entire process cheese, it would not be possible to effect filling of packages with conventional filling machines. Furthermore, the process cheese would not, then, possess the properties desired in the process cheese, namely, homogeneity and spreadability. Thus, if the quantity of added heat-coagulating proteins were such as to cause coagulation of the entire process cheese during its production, it would evidently not be possible to properly stir the process cheese so as to obtain good homogeneity nor would it be possible to readily spread such a coagulated process cheese nor would it be possible to pour such coagulated process cheese into packages.

In contrast to the known methods, one important feature of the invention resides in adding a heat-coagulating protein or heat-coagulating proteins to the process cheese subsequent to its production and, in this manner, the thus-added proteins are in a condition wherein they are able to coagulate under the influence of heat and produce a stiffening or hardening effect. On the other hand, in the process cheeses produced by the known methods, where the proteins are added during production of the process cheese, which includes heating, the proteins in the finished process cheese are present in an already coagulated form by virtue of the heating and are unable to produce any further effects.

Another important feature of the invention resides in that the quantity of heat-coagulating protein added to the process cheese is so large that, as a result of this addition, the protein content of the process cheese per se, that is, predominantly casein, is brought to a coagulated state upon heating to temperatures in excess of 70°C. Thus, in accordance with the invention, the entire protein content of the process cheese per se, as well as the added protein, are to coagulate in much the same manner as a chicken egg.

To more fully illustrate the principles of the invention, it is noted that process cheese normally contains about 10 to 20% by weight of protein, namely, predominantly casein. Due to the addition of emulsifying salts to the process cheese, the casein is brought into soluble form, that is, a form wherein it melts but does not coagulate upon heating. In accordance with the invention, the soluble state of the casein is to be destroyed and a coagulated state, similar to that occurring with a chicken egg when the egg is cooked, is to be achieved in its stead by the addition of heat-coagulating proteins. A co-precipitation of the added protein and the casein may then occur to make the cheese resistant to melting and flowing. If the casein and, hence, the process cheese; is to be made very firm or stiff; then the quantity of added protein should theoretically be equal to the quantity of casein present in the process cheese, that is, the added protein should constitute approximately 10 to 20% by weight of the process cheese (wherever reference is made herein to the quantity of the added protein, this will be understood as being based on the added protein in dried or solid, non-fat form). Experiments have shown, however, that a coagulating effect already sets in when the quantity of added protein is between 20 and 40% by weight of the casein which, for a process cheese having a low content of casein, corresponds to about 1 to 2% by weight of the process cheese and, for a process cheese having a higher content of casein, corresponds to about 4% by weight of the process cheese. Preferably, the quantity of added protein is between approximately 40 and 60% by weight of the casein.

As mentioned earlier, the heat-coagulating proteins advantageously utilized in accordance with the invention coagulate at a temperature of about 70°C, that is, they do not coagulate at temperatures below about 70°C. Thus, when these proteins are added to the process cheese at temperatures below approximately 70°C, they are able to swell and may, upon stirring of the liquid process cheese, become finely divided or dispersed in the latter. However, when the process cheese is heated to temperatures in excess of about 70°C, the added proteins will coagulate. The basic principle for preventing melting of process cheese when it is subjected to heat treatment subsequent to its production is dependent upon this coagulation effect.

In this connection, it is pointed out that the process cheese remains in liquid form when it is cooled to below about 70°C. However, when the liquid process cheese is further cooled to about 55°C, it tends to become quite thick or viscous. On the one hand, then, it becomes difficult to properly stir the added protein into the process cheese and, on the other hand, it becomes difficult, if not impossible, to pour the process cheese into packages when the process cheese is cooled too much below 55°C. Therefore, when the heat-coagulating proteins are added to the process cheese below the coagulation temperatures of the proteins, this addition is preferably carried out when the process cheese has a temperature between approximately 55° and 70°C.

The quantity of heat-coagulating protein added to the process cheese is preferably between 1 and 20% by weight of the process cheese and, more advantageously, between about 2 and 20% by weight of the process cheese. Most advantageously, the quantity of the added protein is between about 3 and 7% by weight of the process cheese. It is favorable when a good mixing of the process cheese and the added protein is effected.

The added protein may, for instance, be globulin, blood albumin, milk albumin or lactalbumin, or dialbumin or egg albumin such as, for example, the albumen of a hen's egg. If desired, more than one protein may be added to the process cheese. The heat-coagulating protein may be added to the process cheese in several different forms. Thus, the added protein may be in dried form when it is added to the process cheese, that is, in the solid form thereof. In this case, the added protein may be in form of a powder, for instance. The added protein may also be in an aqueous medium or in a water-containing medium when it is added to the process cheese. In this event, the protein may, for example, be dissolved in the medium, or it may be present in the medium in some other form. An example of an aqueous medium containing protein in solution is fresh white of egg wherein the protein is present in a concentration of about 9% by weight. In addition to the above, the protein may be added to the process cheese in the form of a food. For instance, the desired quantity of protein in the process cheese may be achieved by adding to the process cheese substances such as a whole egg, particularly a hen's egg, egg albumen, particularly hen's egg albumen, meats, meat products, blood serum, and albumin concentrates of whey, egg yolk and blood plasma.

When the protein is added to the process cheese in form of an aqueous medium or in form of a food, it is preferable for the aqueous medium or the food to have high concentrations of the protein. Also, it will be self-understood that, when the protein is added to the process cheese in these forms, the actual amount of the aqueous medium or the food which must be added to achieve the desired concentration of protein in the process cheese is larger than that required when the protein is added in dried form to obtain the same concentration of protein in the process cheese.

According to one embodiment of the invention, the process cheese is packaged after the heat-coagulating protein has been added thereto without, however, having been heated to temperatures in excess of the coagulation temperature of the protein after addition of the protein. The protein is then present in the process cheese in a non-coagulated form. In this case, coagulation of the protein occurs when the process cheese is subsequently used for the preparation of hot cheese dishes, for example, by a housewife or in a hotel kitchen. Thus, if, for instance, a slice of process cheese in accordance with the invention is placed on toast or white bread and then crisped in an oven, the process cheese is heated to temperatures in excess of 70°C. The added albumins or globulins then coagulate and stiffen or solidify the process cheese to such an extent that it does not run during the crisping operation but, instead, maintains its shape. In fact, temperatures in excess of 70°C are reached in all heat treatments such as broiling, roasting, crisping, toasting, baking, grilling and barbecuing and the simple admixture of the protein with the process cheese is sufficient to prevent melting of the latter.

On the other hand, in cases where the process cheese will not be heated to temperatures in excess of the coagulation temperature of the protein during the preparation of cheese dishes, or in cases where a greater stiffness of the process cheese is desired when the process cheese is subsequently heated to temperatures in excess of the coagulation temperature during the preparation of cheese dishes, another embodiment of the invention is advantageously used. According to this embodiment of the invention, the process cheese is heated, in the manufacturing plant, to a temperature in excess of 70°C after addition of the heat-coagulating protein so as to cause at least part of the added albumins and globulins to coagulate. This heat treatment may be performed in a process cheese boiler with constant movement or stirring of the contents. It is also possible, after addition of the protein, to pour the process cheese into suitable heat-resistant containers, for example, metallic containers such as tins and the like, before the heat treatment and to then carry out the heat treatment in the tins. It is not necessary to stir the process cheese during the heat treatment. When, for instance, the process cheese is heated in such tins for a period of 30 minutes at 90°C, all of the albumins and globulins coagulate and the process cheese produced in this manner has a firm consistency and is capable of being cooked, baked or roasted without flowing or melting.

The heat treatment in the manufacturing plant may also be performed in various other ways. For instance, heat may be supplied to the process cheese using hot water or the process cheese may be heated utilizing vapors, both with and without overpressure. In this connection, it is pointed out that no overpressure is produced in so-called steam cupboards or steam chests. On the other hand, when using an autoclave, an overpressure is produced. Such as overpressure is, however, unnecessary and, in addition, extended dwell times of the process cheese at temperatures in excess of 100°C may adversely affect the quality of the final product.

Although it is sufficient if the heat treatment in the manufacturing plant is carried out at the coagulation temperature of the protein, that is, about 70°C, it is preferable when this heat treatment is performed at a temperature between approximately 80° and 100°C. The time of heat treatment is advantageously between 1 and 60 minutes. The process cheese resulting after the heat treatment is one wherein the proteins are at least partially coagulated and, in the event that the heat treatment is such as to cause coagulation of all the proteins, the process cheese will undergo no further changes upon subsequent heat treatments.

It will be appreciated that the invention has provided a process cheese resistant to melting and flowing when heated. Despite the fact that the process cheese according to the invention never melts, it does not, in contrast to the hard and natural cheeses, form threads, become tough and release whey when subjected to a heat treatment such as crisping or frying, for example. Thus, the invention makes it possible to prepare hot cheese dishes which are superior in quality to those obtainable even with the hard and natural cheeses.

Moreover, the method according to the invention possesses technological advantages in that the desired coagulation does not set in during the operations involved in the production of the process cheese. Thus, the heat-coagulating substance is added to the process cheese after production of the latter. When the heat-coagulating substance is added to the process cheese at a temperature below the coagulation temperature of the substance, it becomes possible to select the point at which coagulation is to occur as desired. On the one hand, the coagulation may be made to occur during the overall production process, that is, subsequent to production of the process cheese but before it leaves the manufacturing plant, whereas, on the other hand, the coagulation may be made to occur only after the process cheese has reached the user, that is, in the household or in the hotel kitchen where the process cheese is used to make hot cheese dishes.

It will be appreciated that the principles according to the invention as outlined above are applicable when heat-coagulating substances having coagulation temperatures other than 70°C are used.

The following Examples are presented in order to illustrate the invention but are not to be construed as in any manner limiting the invention:

EXAMPLE 1

(Process cheese composition for roasting, frying, grilling, etc.)

A process cheese is produced from cheddar cheese, edam cheese, 2.5% by weight of emulsifying salt (calculated on the basis of the finished product) and water. The process cheese contains 43% by weight of dry matter. During its production, the process cheese is brought to a hot, viscous state. 100 kilograms of the hot, viscous process cheese is cooled from the pasteurizing temperature of between 85 and 90°C to a temperature between about 65° and 70°C. Then, 7 kilograms of hen's egg albumen powder is stirred into the process cheese. After thorough mixing, the resulting mixture is immediately filled into meat pie molds or metallic containers. Subsequent to closing the containers, the latter are placed in a steam compartment for a period of 1 hour so that they are heated at temperatures of 90° to 100°C for a period of approximately 1 hour. As a result of this heating the egg albumen coagulates in combination with the soluble casein of the process cheese so that, upon being subsequently heated, the process cheese no longer melts. The process cheese composition may be removed from the containers and baked or fried in a pan. Slices of the process cheese composition are also outstandingly suitable for making toast with cheese (Welsh Rarebits). Due to the addition of fat-free egg albumen, the fat content of the dry matter is reduced from 45% by weight to 38.6% by weight. Consequently, the process cheese composition must be identified as "process cheese composition with at least 35% by weight of fat in the dry matter."

EXAMPLE 2

(Process cheese composition with bits of meat for roasting, frying, grilling, etc.)

100 Kilograms of a process cheese produced from cheddar cheese is, in conventional manner, melted while adding water and 2.5% by weight of emulsifying salt (calculated on the basis of the finished product). In addition, 4 kilograms of butter fat are added in order to compensate for the subsequent drop in the fat content of the dry matter due to the later addition of egg albumen. Moreover, the following quantities and types of spices are added: 100 grams of marjoram powder; 100 grams of pepper; and 100 grams of cummin powder. After the resulting mass has been melted and heated to 90°C, it is cooled down to 70°C. Thereafter, 4 kilograms of hen's egg albumen powder is mixed in and 10 kilograms consisting of bits of beef, pork and tongue, all of which have been precooked, is added. Finally, the mass is poured into containers, in a manner conventionally used for corned beef, and heated in the closed containers at temperatures between 90° and 100°C for a period of 1 hour in a vapor space. In this manner, a process cheese composition containing meat additions is obtained which may be readily sliced and which is capable of being baked, roasted, fried, cooked, etc. As a result of the combined preheating and post-heating, the product may be preserved in the closed containers at room temperature for at least 1 year.

EXAMPLE 3

100 Kilograms of camembert cheese having a fat content of 50% by weight in the dry matter is mixed with 2.5 kilograms of emulsifying salt and, with vigorous stirring, heated to 90°C and maintained at this temperature for a period of 10 minutes. Then, cooling is effected to temperatures between 65° and 69°C. After these temperatures are reached, 7% by weight of hen's egg albumen powder and 3% by weight of blood plasma powder are mixed in. As soon as the mixture becomes homogeneous, it is poured into small aluminum sheet packages having a capacity of 200 grams. Subsequent to sealing of the packages with aluminum foil, these are heated at 100°C for a period of 20 minutes in a vapor stream.

EXAMPLE 4

100 Kilograms of emmentaler cheese is mixed with 2.5 kilograms of emulsifying salt and melted by heating to 90°C. after cooling to 70°C, 50 kilograms of fresh hen's egg white heated to 60°C is added, this addition corresponding to 5.5% by weight of dry hen's egg albumen powder. The low viscosity mass is then poured into molds and heated at 100°C for a period of 40 minutes in a vapor stream. After cooling, the blocks of process cheese are removed from the molds and, in the manner of cutting cheese, mechanically cut into slices and packed in flat foil packages. The slices are cut to such a thickness (5 to 10 millimeters) that they can be roasted or fried in a pan in the manner of a cutlet or chop.

EXAMPLE 5

100 Kilograms of emmentaler cheese is comminuted and then well mixed with 2.5 kilograms of emulsifying salt and 30 kilograms of water. Then, melting is effected by heating while stirring. In order to make the end product capable of being preserved, the mixture is heated at 95°C for a period of 10 minutes. Subsequent to the heating, the low viscosity mass is cooled to 70°C. After stirring in 10 kilograms of hen's egg albumen powder, spices such as paprika, pepper and onion powder, and 1% by weight of common salt, the mass is filled into molds. The resulting slices of process cheese may also be roasted, fried, etc., without melting.

EXAMPLE 6

100 Kilograms of hollander cheese is comminuted and, after the addition of 2.5 kilograms of emulsifying salt and 10 kilograms of water, heated to 90°C while stirring. Half of the hollander cheese is constituted by edam cheese having a fat content of 40% by weight in the dry matter and half of the hollander cheese is constituted by gouda cheese having a fat content of 45% by weight in the dry matter. After cooling to 70°C, the mass is mixed with 10 kilograms of fresh whole egg heated to 60°C, 10 kilograms of fresh hen's egg albumen (corresponding to 1.1 kilograms of hen's egg albumen powder) heated to 60°C and 5 kilograms of hen's egg albumen powder. The resulting mass is filled into containers and heated at 100°C for a period of 1 hour. A product is obtained which may be cut into slices and, after any desired spicing, roasted, fried, baked, etc.

It will be understood that each of the elements described above, or two or more together, may also find a useful application in other types of processes and products differing from the types described above.

While the invention has been illustrated and described as embodied in a process cheese and method of making the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Method of making a melt-resistant process cheese which comprises mixing cheese with emulsifying salt and water, pasteurizing the resultant mixture by heating to 80° to 110°C to produce process cheese, cooling the process cheese to a temperature within the range of 55° to 70°C, adding to the cooled process cheese a protein selected from the group consisting of egg albumin, lactalbumin, blood albumin and globulin in an amount of 2 to 20%, filling the resulting mixture into containers and heating to 80°–100°C to cause the added protein to coagulate in combination with the casein of the process cheese to solidify the process cheese.

2. Method according to claim 1, wherein said protein is added in an amount of about 3 to 7 wt. %.

3. Method according to claim 1, wherein said protein is added in the form of an aqueous medium containing the protein.

4. Method according to claim 1, wherein said protein is added in the form of a food product containing the protein.

5. Method according to claim 1, wherein said protein is added in dried form.

6. Method according to claim 1, wherein said process cheese and added protein are subjected to mixing.

* * * * *